United States Patent
Kim et al.

(10) Patent No.: US 7,391,171 B2
(45) Date of Patent: Jun. 24, 2008

(54) DISPLAY APPARATUS AND CONTROL METHOD THEREOF

(75) Inventors: Jae-woo Kim, Suwon-si (KR); Woon-suk Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/290,446

(22) Filed: Dec. 1, 2005

(65) Prior Publication Data
US 2006/0273742 A1    Dec. 7, 2006

(30) Foreign Application Priority Data
Jun. 1, 2005    (KR) .................. 10-2005-0046794

(51) Int. Cl.
*H05B 37/02* (2006.01)
(52) U.S. Cl. ................. 315/307; 315/149; 345/102
(58) Field of Classification Search ... 315/169.1–169.3, 315/157, 158, 308, 149, 156, 291, 307, 309; 345/77, 84, 87, 102
See application file for complete search history.

(56) References Cited

U.S. PATENT DOCUMENTS 5,343,116 A * 8/1994 Winsor .................. 313/493
6,388,388 B1 * 5/2002 Weindorf et al. .......... 315/169.3
6,630,914 B1 * 10/2003 Tamekuni et al. ............ 345/8
7,183,727 B2 * 2/2007 Ferguson et al. ............ 315/308
2005/0253537 A1 * 11/2005 Jang et al. .................. 315/307

FOREIGN PATENT DOCUMENTS

| JP | 05-326165 | 12/1993 |
| JP | 08-171995 | 7/1996 |
| JP | 11-305197 | 11/1999 |
| JP | 2000-058285 | 2/2000 |

* cited by examiner

*Primary Examiner*—Douglas W. Owens
*Assistant Examiner*—Jimmy T Vu
(74) *Attorney, Agent, or Firm*—Roylance, Abrams, Berdo and Goodman, LLP

(57) ABSTRACT

A display apparatus is provided having an LCD panel and a backlight unit to illuminate the LCD panel, and further including a temperature sensor to sense the temperature of the backlight unit, an inverter to drive the backlight unit, a power supply to supply power to the inverter, and a controller to control the power supply to supply an initial voltage that is higher than a normal voltage when the power is initially supplied, and gradually lower the voltage applied to the inverter to return to a substantially normal voltage in the case where the temperature of the backlight unit is higher than a predetermined normal temperature or when a time period has passed. Thus, the display apparatus and control method thereof reduce the time taken to stabilize brightness when initially driving a display apparatus, and display a stable and high-quality picture.

10 Claims, 6 Drawing Sheets

US 7,391,171 B2

DISPLAY APPARATUS AND CONTROL METHOD THEREOF

CROSS-REFERENCE TO RELATED APPLICATIONS

This application claims the benefit under 35 U.S.C. §119(a) of Korean Patent Application No. 10-2005-0046794, filed in the Korean Intellectual Property Office on Jun. 1, 2005, the entire disclosure of which is incorporated herein by reference.

BACKGROUND OF THE INVENTION

1. Field of the Invention

The present invention relates to a display apparatus and a control method thereof. More particularly, the present invention relates to a display apparatus and a control method thereof, which reduces the time taken to stabilize the brightness when initially driving a display apparatus and which displays a stable and high-quality picture.

2. Description of the Related Art

In general, a display apparatus with a liquid crystal (LCD) panel comprises a backlight unit to illuminate the LCD panel, an inverter to drive the backlight unit, and a power supply to supply power to the inverter. In the conventional display apparatus, the brightness of the LCD panel is varied as the backlight unit is driven when the power is initially supplied, a phenomena which is described in greater detail below with reference to FIG. 1A.

While initially supplying the power, the power supply supplies a normal voltage to the inverter so as to drive the backlight unit. Thus, the inverter receives the normal voltage and drives the backlight unit such that the brightness of the LCD panel gradually increases and approximately reaches normal brightness (about 90%) after a lapse of a time t1.

However, the conventional display apparatus has a disadvantage in that the time t1 taken to reach normal brightness is relatively long.

A conventional display apparatus for overcoming this disadvantage is described in greater detail below with reference to FIG. 11B. In this conventional display apparatus, the power supply supplies an overvoltage to the inverter when the power is initially supplied such that the brightness of the LCD panel reaches normal brightness after a lapse of a shorter time t2. Then, when the temperature of the backlight unit reaches a predetermined temperature at a time t2', the power supply supplies the normal voltage to the inverter. However, in this case the brightness of the LCD panel rapidly increases until the time t2' and then suddenly returns to the normal brightness due to voltage variation (that is, the variation from the overvoltage returning to the normal voltage).

Thus, in the foregoing display apparatus, when the power is initially supplied to drive the backlight unit, the brightness of the LCD panel is suddenly changed after the lapse of the time t2' such that the LCD panel blinks and provides a user with a low quality picture.

Accordingly, a need exists for a system and method for reducing the time taken to stabilize the brightness and display a high-quality picture in a display apparatus.

SUMMARY OF THE INVENTION

Accordingly, it is an aspect of the present invention to address the above and other problems, and provide a display apparatus and a control method thereof which reduces the time taken to stabilize the brightness when initially driving a display apparatus and which displays a stable and high-quality picture.

Additional aspects and advantages of the invention will be set forth in part in the description which follows and, in part, will be obvious from the description, or may be learned by practice of the embodiments of the present invention.

The foregoing and other aspects of the present invention are achieved by, for example, providing a display apparatus comprising an LCD panel and a backlight unit to illuminate the LCD panel, the display apparatus further comprising a temperature sensor to sense the temperature of the backlight unit, an inverter to drive the backlight unit, a power supply to supply power to the inverter, and a controller to control the power supply to supply an initial voltage that is higher than a normal voltage when the power is initially supplied, and which gradually lowers the voltage applied to the inverter to return to a substantially normal voltage in the case where the temperature of the backlight unit is higher than a predetermined normal temperature.

According to an aspect of the present invention, the controller also controls the power supply to gradually lower the voltage applied to the inverter and make the voltage return to a substantially normal voltage when a predetermined normal time elapses after initially supplying the power of the initial voltage.

According to another aspect of the present invention, the controller employs a pulse width modulation (PWM) control signal for controlling the power supply.

According to yet another aspect of the present invention, the backlight unit comprises a flat fluorescent lamp (FFL).

According to yet another aspect of the present invention, the temperature sensor is placed in a predetermined region of the LCD panel to sense the temperature of the FFL lamp.

The foregoing and other aspects of the present invention are also achieved by providing a method of controlling a display apparatus comprising an LCD panel, a backlight unit to illuminate the LCD panel, an inverter to drive the backlight unit, and a power supply to supply power to the inverter. The method comprises the steps of controlling the power supply to supply an initial voltage that is higher than a normal voltage when the power is initially supplied, determining whether the temperature of the backlight unit is higher than a predetermined normal temperature, and controlling the power supply to gradually lower the voltage applied to the inverter and make the voltage return to a substantially normal voltage when the temperature of the backlight unit is higher than the normal temperature.

According to an aspect of the present invention, the step of gradually lowering the voltage applied to the inverter comprises the steps of lowering the voltage applied to the inverter by a predetermined level, determining whether the lowered voltage is equal to the normal voltage, determining whether a predetermined time has elapsed in the case wherein the lowered voltage is different from the normal voltage, and returning to the step of lowering the voltage applied to the inverter by a predetermined level when the predetermined time elapses.

According to another aspect of the present invention, the method further comprises the steps of controlling the power supply to continuously supply the normal voltage to the inverter in the case wherein the lowered voltage is substantially equal to the normal voltage.

According to yet another aspect of the present invention, the power supply is controlled by a PWM control signal.

According to yet another aspect of the present invention, the method further comprises the steps of determining whether a predetermined normal time has elapsed after initially supplying the power of the initial voltage, and controlling the power supply to gradually lower the voltage applied to the inverter to make the voltage return to a substantially normal voltage when the normal time elapses.

According to yet another aspect of the present invention, the backlight unit comprises an FFL lamp.

BRIEF DESCRIPTION OF THE DRAWINGS

These and other aspects and advantages of the present invention will become apparent and more readily appreciated from the following description of the embodiments, taken in conjunction with the accompany drawings, of which.

Throughout the drawings, like reference numerals will be understood to refer to like parts, components and structures.

DETAILED DESCRIPTION OF THE EXEMPLARY EMBODIMENTS

Figure 1A:
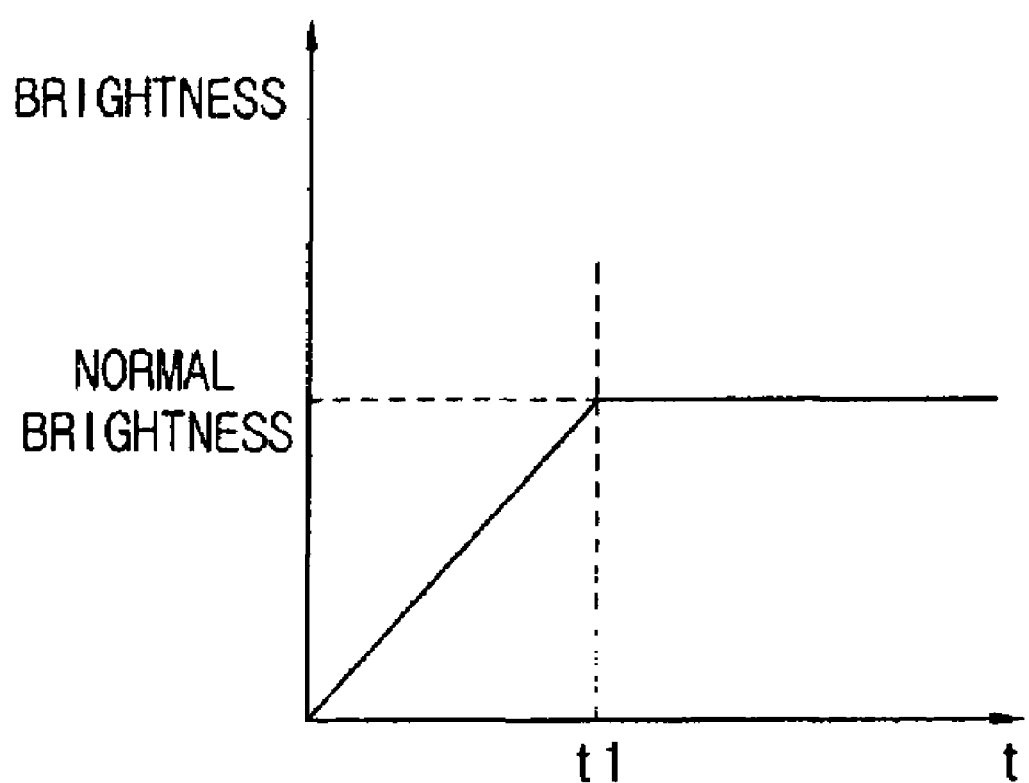
FIGS. 1A and 1B show graphs illustrating variation in brightness when power is initially supplied to a conventional display apparatus.
Figure 1B:
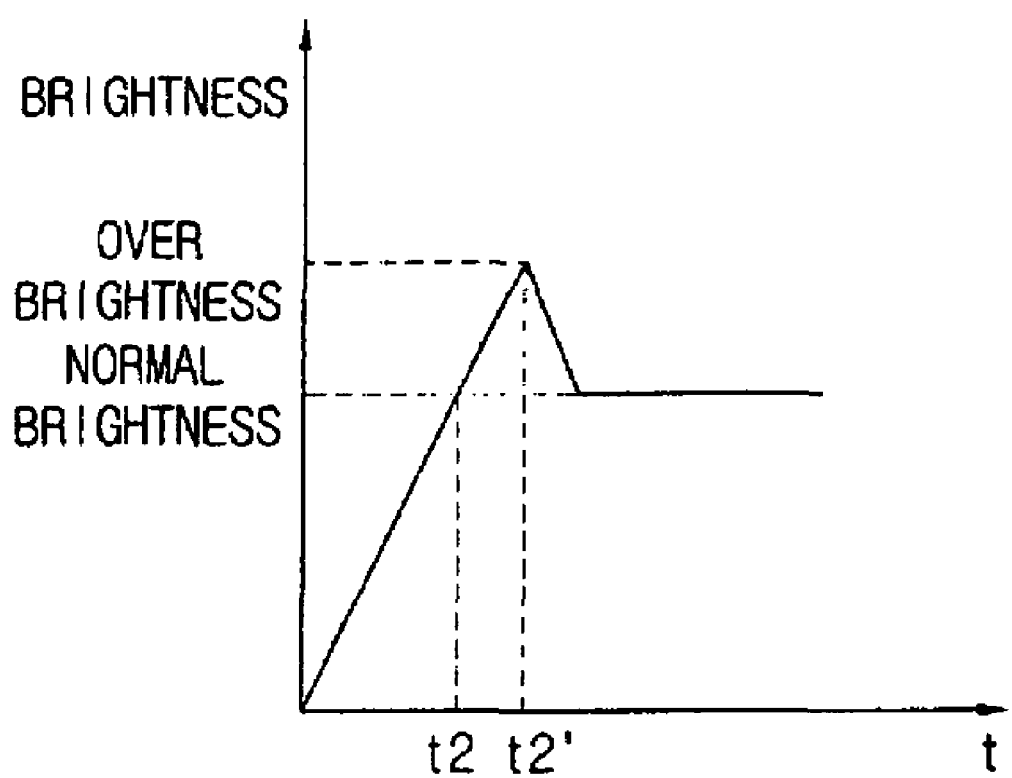

Reference will now be made in detail to embodiments of the present invention, examples of which are illustrated in the accompanying drawings, wherein like reference numerals refer to like elements throughout. The embodiments are described below so as to explain the present invention by referring to the figures.

Figure 2:
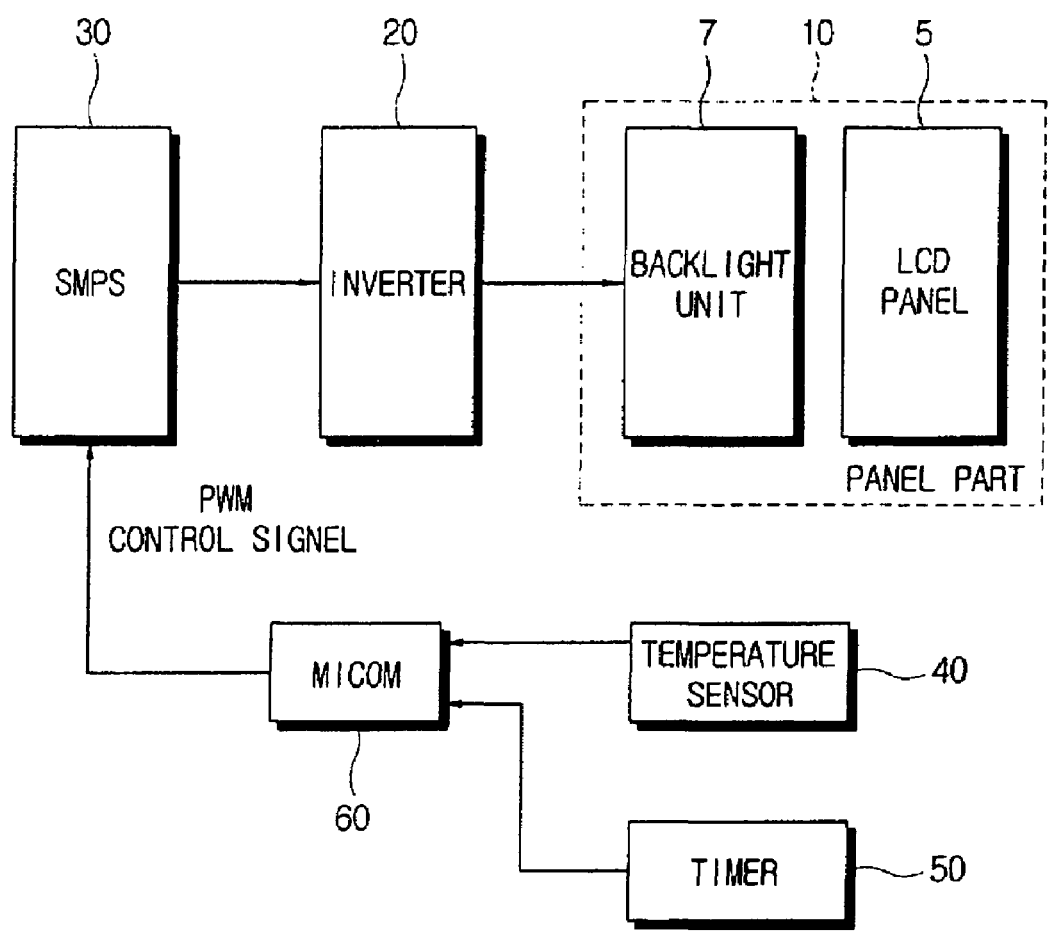
FIG. 2 is a control block diagram of a display apparatus according to an embodiment of the present invention.

FIG. 2 is a control block diagram of a display apparatus according to an exemplary embodiment of the present invention. As shown therein, a display apparatus according to an embodiment of the present invention includes a panel part 10 comprising an LCD panel 5 and a backlight unit 7 for illuminating the LCD panel 5, an inverter 20 for driving the backlight unit 7, a switching mode power supply (SMPS) 30 for supplying power to the inverter 20, a temperature sensor 40 for sensing the temperature of the backlight unit 7, a timer 50, and a microcomputer (MICOM) as a controller 60 for controlling the SMPS 30 to supply an initial voltage that is higher than a normal voltage when the power is initially supplied, and to gradually lower the voltage applied to the inverter 20 so as to make the voltage return to a substantially normal voltage when the temperature sensor 40 senses that the temperature of the backlight unit 7 is higher than a predetermined normal temperature.

The backlight 7 preferably comprises a flat fluorescent lamp (FFL).

The inverter 20 receives direct current (DC) power from the SMPS 30 and converts the DC power into alternating current (AC) power, thereby supplying the AC power to the backlight unit 7 of the LCD panel 5.

The SMPS 30 is used as a power supply to supply the power to the inverter 20. Here, the SMPS 30 is controlled by the MICOM 60 to gradually boost or lower the voltage of the power supplied to the inverter 20.

The temperature sensor 40 is placed in a position to sense the temperature of the backlight unit 7. For example, the temperature sensor 40 can be placed in a predetermined back region of the LCD panel 5 so as to sense the temperature of the FFL backlight unit 7.

The MICOM 60 controls the SMPS 30 to supply the initial voltage that is higher than the normal voltage to the inverter 20 when the power is initially supplied, i.e., when the backlight unit 7 is initially driven. While controlling the SMPS 30 to supply the initial voltage to the inverter 20, the MICOM 60 determines whether the temperature of the backlight unit 7 is higher than the normal temperature on the basis of a sensing result of the temperature sensor 40. When the temperature of the backlight unit 7 is higher then the normal temperature, the MICOM 60 controls the SMPS 30 to gradually lower the initial voltage supplied to the inverter 20, thereby making the initial voltage return to a substantially normal voltage. Here, the normal temperature can denote, for example, a temperature of the backlight unit 7 that is expected when the brightness of the LCD panel 5 reaches normal brightness as the initial voltage is applied to the inverter 20 and the temperature of the backlight unit 7 increases.

Below, operations of the MICOM 60 to gradually lower the initial voltage applied to the inverter 20 and make the voltage return to a substantially normal voltage will be described with reference to FIG. 4B. The MICOM 60 outputs a first pulse width modulation (PWM) control signal to the SMPS 30, thereby controlling the SMPS 30 to supply the initial voltage (for example, 6.5V) to the inverter 20 when the backlight unit 7 is initially driven. At a time t3 when the temperature of the backlight unit 7 is higher than the normal temperature, the MICOM 60 outputs a second PWM control signal to the SMPS 30, thereby controlling the SMPS 30 to supply a first step voltage c, which is lower than the initial voltage by a predetermined level, to the inverter 20. Here, the first step voltage c is lower than the initial voltage (for example, 6.5V) and higher than the normal voltage (for example, 1.6V). Further, when the MICOM 60 determines that a predetermined time T elapses after outputting the second PWM control signal on the basis of the timer 50, the MICOM 60 outputs a third PWM control signal to the SMPS 30, thereby controlling the SMPS 30 to supply a second step voltage d, which is lower than the first step voltage c by a predetermined level, to the inverter 20 at a time t4. Likewise, the second step voltage d is lower then the first step voltage c and higher than the normal voltage (for example, 1.6V). Further, when the MICOM 60 determines that the time T elapses after outputting the third PWM control signal on the basis of the timer 50, the MICOM 60 outputs a fourth PWM control signal to the SMPS 30, thereby controlling the SMPS 30 to supply a third step voltage e, which is lower than the second step voltage d by a predetermined level, to the inverter 20 at a time t5. Thus, the MICOM 60 employs the PWM control signals for lowering the voltage applied to the inverter 20 by a predetermined level at every lapse of the time T, thereby controlling the SMPS 30 to make the voltage return to a substantially normal voltage (for example, 1.6V) at a time t6.

Thus, the SMPS 30 gradually lowers the voltage of the power supplied to the inverter 20 on the basis of the PWM control signals. As a result, the SMPS 30 supplies the power having the normal voltage to the inverter 20 from the time t6 onward.

Figure 4A:
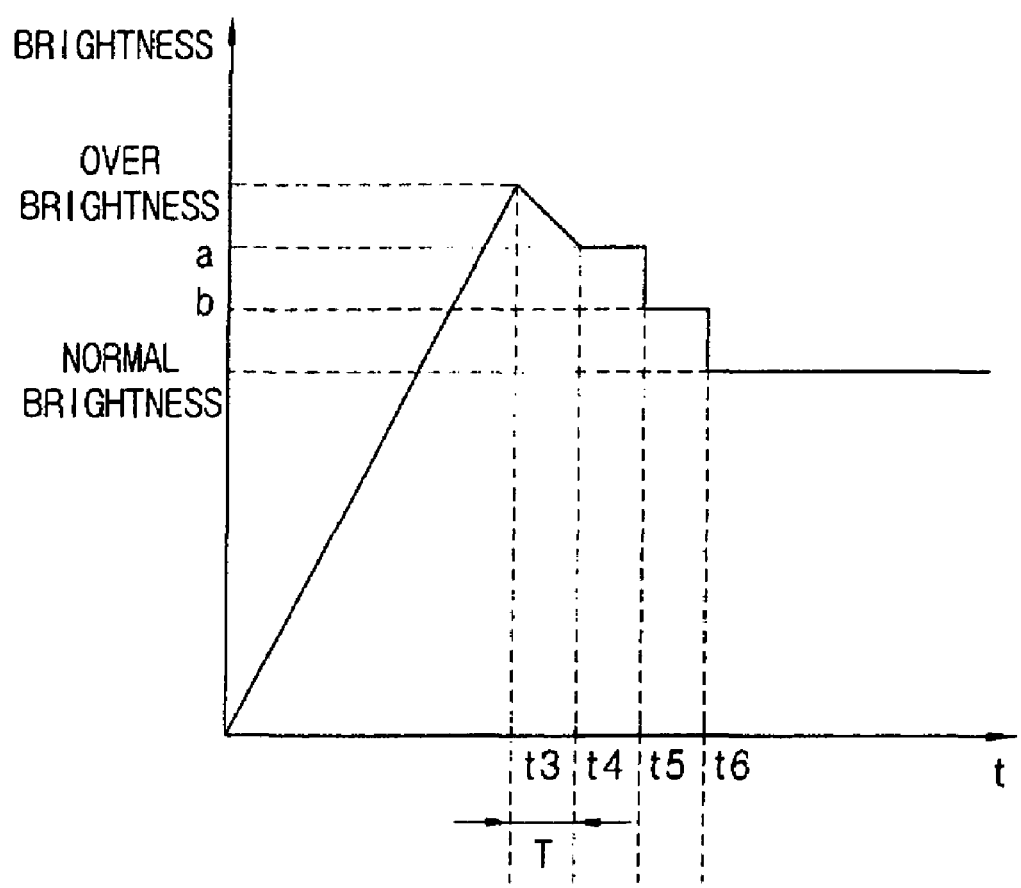
FIGS. 4A and 4B show graphs illustrating variation in brightness and voltage when power is initially supplied to the display apparatus according to an embodiment of the present invention.
Figure 4B:
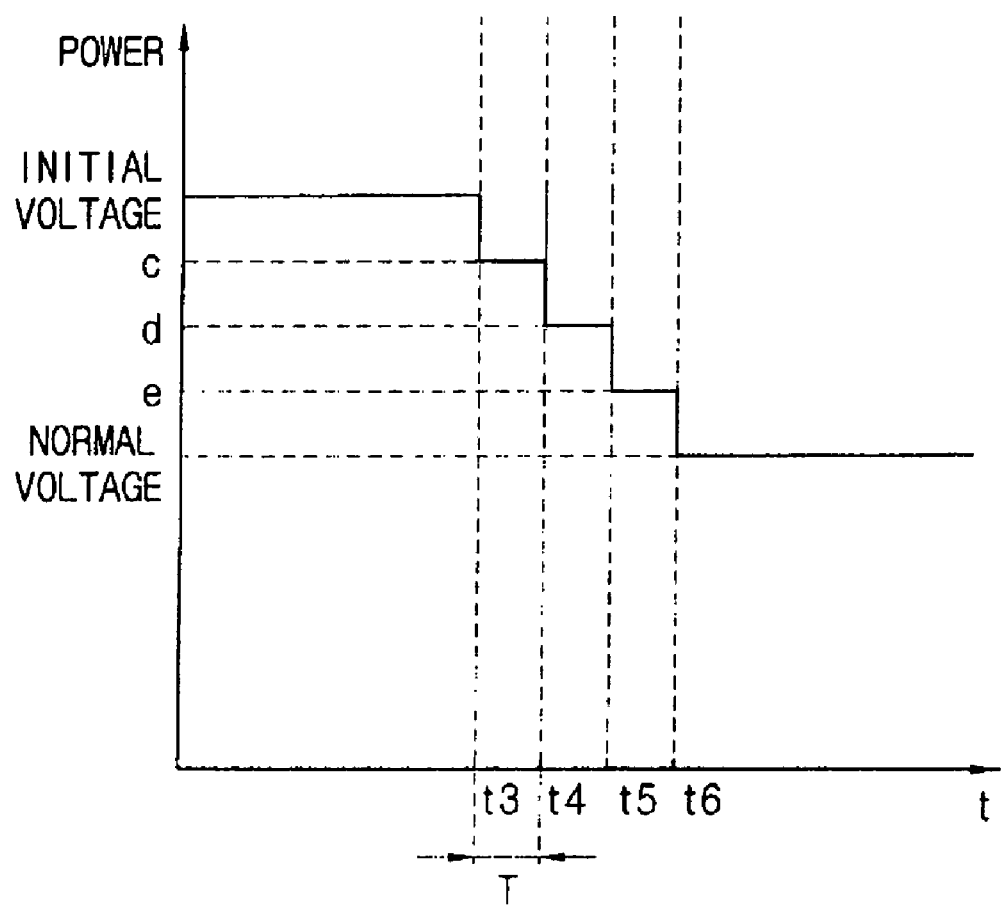

Therefore, as shown in FIG. 4A, the brightness of the LCD panel 5 rapidly increases until the time t3 for the initial voltage (for example, 6.5) and then smoothly reaches the normal brightness. The brightness of the LCD panel 5 decreases to brightness a, brightness b, and so on as the voltage supplied to the inverter 20 is gradually lowered at times t3, t4, and t5, respectively, thereby reaching the normal brightness at time t6 onward.

While controlling the SMPS 30 to supply the initial voltage to the inverter 20 when the power is initially supplied, the MICOM 60 determines whether a predetermined normal time elapses after supplying the initial voltage on the basis of the timer 50. When the normal time elapses after supplying the initial voltage, the MICOM 60 controls the SMPS 30 to gradually lower the initial voltage supplied to the inverter 20, thereby making the initial voltage return to a substantially normal voltage. Here, the normal time preferably denotes an expected time required to make the brightness of the LCD panel 5 reach normal brightness from the time when the initial voltage is first applied to the inverter 20.

That is, the MICOM 60 outputs the first PWM control signal to the SMPS 30 in order to control the SMPS 30 to supply the initial voltage to the inverter 20, and then determines whether the temperature of the backlight unit 7 is higher than the normal temperature. At substantially the same time, the MICOM 60 outputs the first PWM control signal and determines whether the normal time has elapsed. Thus, even though the temperature of the backlight unit 7 is not higher than the normal temperature, when the MICOM 60 outputs the first PWM control signal and determines that the normal time elapses, the MICOM 60 controls the SMPS 30 to gradually lower the initial voltage supplied to the inverter 20, thereby making the initial voltage return to a substantially normal voltage. Here, when the MICOM 60 outputs the first PWM control signal and determines that the normal time has elapsed, the MICOM 60 gradually lowers the initial voltage supplied to the inverter 20 and makes the initial voltage return to a substantially normal voltage in substantially the same manner as when the temperature of the backlight 7 is higher than the normal temperature.

Thus, because the initial voltage (or overvoltage) that is higher than the normal voltage is applied to the inverter 20, the display apparatus according to an embodiment of the present invention quickly reaches normal brightness when the power is initially supplied. Further, the display apparatus according to an embodiment of the present invention gradually lowers the voltage supplied to the inverter 20 so as to make the voltage return to a substantially normal voltage when a predetermined event is generated (for example, when the temperature of the backlight unit 7 is higher than the normal temperature or when the normal time elapses after the initial voltage is supplied) after reaching normal brightness, thereby substantially eliminating the blinking problem due to sudden variation in the voltage of the power supplied to the inverter 20.

Alternatively, the display apparatus according to another embodiment of the present invention may not include the temperature sensor 40. That is, the display apparatus according to an embodiment of the present invention can gradually lower the initial voltage supplied to the inverter 20 without considering the temperature of the backlight unit 7, so as to make the initial voltage return to the substantially normal voltage only when the normal time elapses on the basis of the timer 50.

Figure 3:
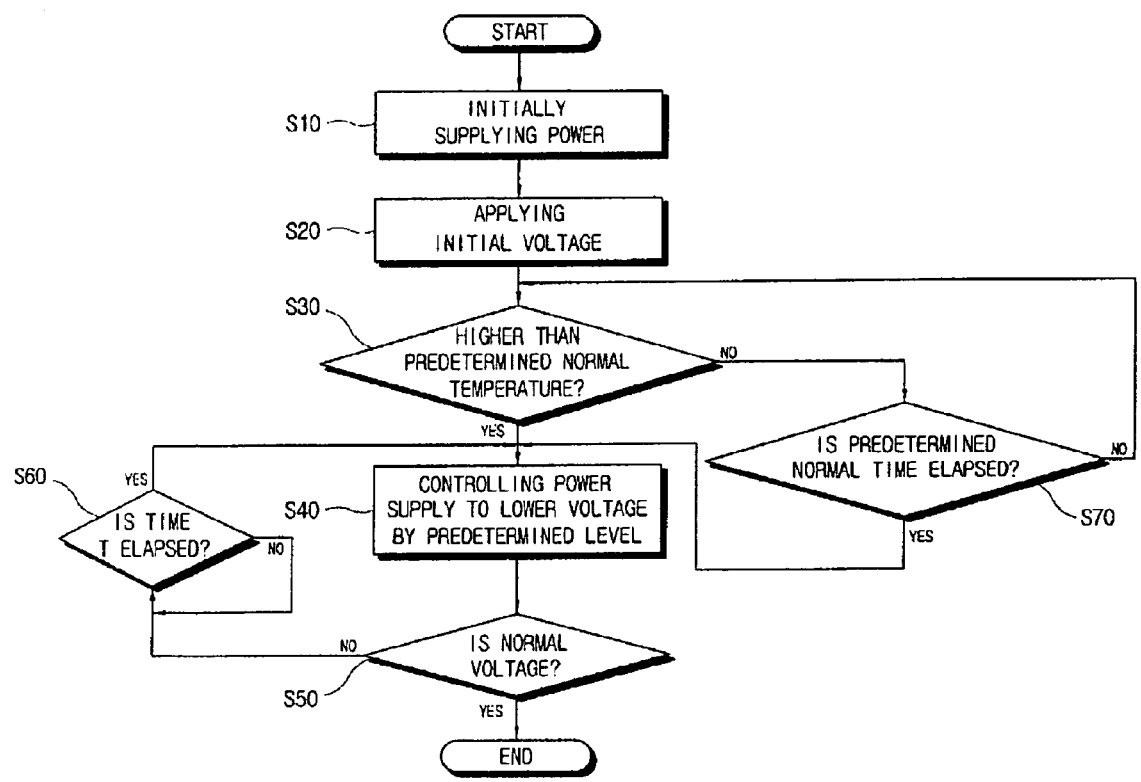
FIG. 3 is a control flowchart of the display apparatus according to an embodiment of the present invention.

Below, exemplary operations of the display apparatus with such a configuration according to an embodiment of the present invention, will be described with reference to FIG. 3. As shown therein, at operation S10, the power is initially supplied to the display apparatus. At operation S20, the MICOM 60 controls the SMPS 30 to supply the initial voltage to the inverter 20, thereby initially driving the backlight unit 7. At operation S30, the MICOM 60 determines whether the temperature of the backlight unit 7 is higher than the normal temperature on the basis of the sensing result of the temperature sensor 40. At operation S40, when it is determined that the temperature of the backlight unit 7 is higher than the normal temperature, the MICOM 60 controls the SMPS 30 to supply the first step voltage lower than the initial voltage by a predetermined level to the inverter 20. At operation S50, the MICOM 60 determines whether the lowered first step voltage is equal to the normal voltage. When the first step voltage is not equal to the normal voltage, the MICOM 60 determines whether the time T has elapsed at operation S60. After a lapse of time T, the MICOM 60 performs the operation S40 again in order to control the SMPS 30 to supply the second step voltage lower than the first step voltage by a predetermined level to the inverter 20, and then repeats the operations S50 and S60.

When it is determined in the operation S30 that the temperature of the backlight unit 7 is not higher than the normal temperature, the MICOM 60 determines at operation S70 whether the normal time has elapsed after performing the operation S20 at which the initial voltage is initially supplied. In the case wherein the normal time has elapsed after supplying the initial voltage, the MICOM 60 performs the operations S40 through S60 at which the SMPS 30 is controlled to gradually lower the initial voltage and make the initial voltage return to a substantially normal voltage.

In the method of controlling the display apparatus with this configuration according to an embodiment of the present invention, the initial voltage (or overvoltage) that is higher than the normal voltage is applied to the inverter 20, such that the display apparatus quickly reaches normal brightness when the power is initially supplied. Further, in the control method according to an embodiment of the present invention, the display apparatus gradually lowers the voltage supplied to the inverter 20 so as to make the voltage return to a substantially normal voltage when a predetermined event is generated (for example, when the temperature of the backlight unit 7 is higher than the normal temperature or when the normal time elapses after the initial voltage is supplied) after reaching normal brightness, thereby substantially eliminating the blinking problems due to sudden variations in the voltage of the power supplied to the inverter 20.

As described above, exemplary embodiments of the present invention provide a display apparatus and a control method thereof, which reduce the time taken to stabilize brightness when initially driving a display apparatus and which display a stable and high-quality picture.

Although a number of exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus, comprising:
a liquid crystal display (LCD) panel;
a backlight unit for illuminating the LCD panel;
a temperature sensor for sensing a temperature of the backlight unit;
an inverter for driving the backlight unit;
a power supply for supplying power to the inverter; and
a controller for controlling the power supply to apply an initial voltage that is higher than a normal voltage when the power is initially supplied, and if the temperature of the backlight unit is higher than a normal temperature, gradually lower the voltage applied to the inverter to substantially return to the normal voltage, and the controller further configured to control the power supply to gradually lower the voltage applied to the inverter to substantially return to the normal voltage when a time period elapses after supplying the initial voltage.

2. The display apparatus according to claim 1, wherein the controller is configured to employ a pulse width modulation (PWM) control signal for controlling the power supply.

3. The display apparatus according to claim 1, wherein the backlight unit comprises a flat fluorescent lamp (FFL).

4. The display apparatus according to claim 3, wherein the temperature sensor is placed to sense the temperature of the FFL lamp.

5. A method of controlling a display apparatus comprising a liquid crystal display (LCD) panel, a backlight unit to illuminate the LCD panel, an inverter to drive the backlight unit, and a power supply to supply power to the inverter, the method comprising:
  applying an initial voltage that is higher than a normal voltage when power is initially supplied;
  determining whether the temperature of the backlight unit is higher than a normal temperature; and
  gradually lowering the voltage applied to substantially return to the normal voltage if the temperature of the backlight unit is higher than the normal temperature by lowering the voltage applied to the inverter by a predetermined level, determining whether the lowered voltage is substantially equal to the normal voltage, determining whether a time period has elapsed if the lowered voltage is different from the normal voltage, and repeating the lowering of the voltage applied to the inverter by a predetermined level after the time period has elapsed.

6. The method according to claim 5, further comprising:
  controlling the power supply to continuously supply the normal voltage to the inverter if the lowered voltage is substantially equal to the normal voltage.

7. The method according to claim 6, wherein the power supply is controlled by a pulse width modulation (PWM) control signal.

8. The method according to claim 5, further comprising:
  determining whether a time period has elapsed after supplying the initial voltage; and
  gradually lowering the voltage applied to the inverter after the time period has elapsed.

9. The method according to claim 8, further comprising gradually lowering the voltage to substantially return to the normal voltage.

10. The method according to claim 5, wherein the backlight unit comprises a flat fluorescent lamp (FFL).

* * * * *